United States Patent [19]
Yumoto et al.

[11] Patent Number: 5,183,439
[45] Date of Patent: Feb. 2, 1993

[54] CONTROL SYSTEM FOR CONTINUOUSLY VARIABLE TRANSMISSION

[75] Inventors: Toshiyuki Yumoto; Kouhei Ohsono, both of Fujimi; Masahiro Kanda, Higashimatsuyama; Takahiro Matsuda, Hiki, all of Japan

[73] Assignee: Honda Giken Kogyo Kabushiki Kaisha, Tokyo, Japan

[21] Appl. No.: 805,402

[22] Filed: Dec. 10, 1991

[30] Foreign Application Priority Data

Jan. 22, 1991 [JP] Japan ............................ 3-021692

[51] Int. Cl.5 ............................................ F16H 59/00
[52] U.S. Cl. .................................. 474/28; 474/69
[58] Field of Search ............... 474/8, 11, 12, 17, 18, 474/28, 69, 70; 74/865-868

[56] References Cited

U.S. PATENT DOCUMENTS

| | | | |
|---|---|---|---|
| 4,672,864 | 6/1987 | Morimoto | 474/28 X |
| 4,955,848 | 9/1990 | Kotajima | 474/28 |
| 5,083,982 | 1/1992 | Sato | 474/28 |

FOREIGN PATENT DOCUMENTS

| | | |
|---|---|---|
| 272108 | 6/1988 | European Pat. Off. . |
| 306351 | 3/1989 | European Pat. Off. . |
| 324928 | 7/1990 | European Pat. Off. . |
| 412758 | 2/1991 | European Pat. Off. . |
| 61-206862 | 9/1986 | Japan . |
| 63-215437 | 9/1988 | Japan . |

OTHER PUBLICATIONS

English Language Abstract of JP 61-2068162 & 63-215437.

*Primary Examiner*—Thuy M. Bui
*Attorney, Agent, or Firm*—Lyon & Lyon

[57] ABSTRACT

A belt-type continuously variable transmission for use with a motor vehicle engine has a hydraulic actuator for effecting at least one of speed ratio control and clutch control. The belt-type continuously variable transmission is controlled by a control system including a solenoid-operated control valve for generating a controlling hydraulic pressure to be supplied to the hydraulic actuator, a hydraulic pressure generator for generating a hydraulic pressure corresponding to the rotational speed of the engine, a directional control valve for selectively connecting the solenoid-operated control valve and the hydraulic pressure generating means to the hydraulic actuator, and a solenoid-operated on-off valve for controlling the directional control valve. When the solenoid of the solenoid-operated on-off valve is energized, the directional control valve connects the solenoid-operated control valve to the hydraulic actuator, and when the solenoid is de-energized, the directional control valve connects the hydraulic pressure generator to the hydraulic actuator.

15 Claims, 4 Drawing Sheets

CONTROL SYSTEM FOR CONTINUOUSLY VARIABLE TRANSMISSION

BACKGROUND OF THE INVENTION

1. Field of the Invention

The present invention relates to a control system for controlling the engagement of a clutch and the speed ratio of a continuously variable transmission, and more particularly to a control system for electrically controlling the engagement of a clutch and the speed ratio of a continuously variable transmission.

2. Description of the Prior Art

Continuously variable transmissions such as belt-type continuously variable transmissions have been proposed in the past, and have already found use in automobiles or the like. The belt-type continuously variable transmissions typically comprise a metallic V-belt trained around drive and driven movable pulleys whose width is variable. The belt-type continuously variable transmissions are often required to have a neutral state, which is achieved by a clutch that is disposed in the power transmission path from an input shaft to an output shaft for selectively transmitting engine power from the input shaft to the output shaft.

The speed ratio of the belt-type continuously variable transmission is controlled when the widths of the drive and driven pulleys vary. The clutch is controlled to select the neutral state and also to start moving the automobile. To control the widths of the drive and driven pulleys, the belt-type continuously variable transmission has a hydraulic cylinder for imparting a lateral pressure to the movable pulley cone of each of the pulleys. The lateral pressure applied to the movable pulley member by the hydraulic cylinder is controlled to vary the effective pulley diameters for thereby controlling the speed ratio. The control of the lateral pressure applied to the pulleys is also effective to control the tension of the V-belt. One known control system for controlling a belt-type continuously variable transmission is disclosed in Japanese Laid-Open Patent Publication No. 61-206862, for example.

In the case where a belt-type continuously variable transmission of the above structure is incorporated in an automobile, the lateral pressure applied to the pulleys and the engagement of the clutch are controlled depending on the throttle opening and rotational speed of the engine of the automobile which actuates the belt-type continuously variable transmission. It is possible to generate hydraulic pressures for controlling the pulleys and the clutch using an intake vacuum of the engine and a governor valve, and to employ the generated hydraulic pressures to control the pulleys and the clutch. However, use of such hydraulic pressures makes the control system complex due to hydraulic valves that are needed, and fails to perform sophisticated control operation.

Frequently, the above controlling hydraulic pressures are generated based on detected electric signals representing the throttle opening and rotational speed of the engine. Japanese Laid-Open Patent Publication No. 63-215437, for example, discloses a control system for controlling a belt-type continuously variable transmission with controlling hydraulic pressures generated on the basis of electric signals.

The controlling hydraulic pressures are generated using solenoid-operated valves and an electrically operated actuator based on the electric signals. In the event of an electric failure that cuts off the supply of electric energy to the solenoid-operated valves and the electrically operated actuator, the solenoid-operated valves and the electrically operated actuators fail to operate, and the belt-type continuously variable transmission cannot be controlled.

SUMMARY OF THE INVENTION

It is an object of the present invention to provide a control system for controlling the engagement of a clutch and the speed ratio of a continuously variable transmission with controlling hydraulic pressures generated by solenoid-operated valves and an electrically operated actuator.

Another object of the present invention is to provide a control system which is capable of controlling a continuously variable transmission to some extent even in the event of an electric failure that cuts off the supply of electric energy to solenoid-operated valves and an electrically operated actuator which generate controlling hydraulic pressures.

Still another object of the present invention is to provide a control system which enables a continuously variable transmission incorporated in a motor vehicle to control the running of the motor vehicle even in the event of an electric failure that cuts off the supply of electric energy to solenoid-operated valves and an electrically operated actuator which generate controlling hydraulic pressures.

According to the present invention, there is provided a control system for a continuously variable transmission having a hydraulic actuator for effecting at least one of speed ratio control and clutch control, comprising a solenoid-operated control valve for generating a controlling hydraulic pressure to be supplied to the hydraulic actuator, hydraulic pressure generating means for generating a hydraulic pressure corresponding to the rotational speed of an engine which is associated with the continuously variable transmission, a directional control valve for selectively connecting the solenoid-operated control valve and the hydraulic pressure generating means to the hydraulic actuator, and a solenoid-operated on-off valve for controlling the directional control valve such that when a solenoid of the solenoid-operated on-off valve is energized, the directional control valve connects the solenoid-operated control valve means to the hydraulic actuator, and when the solenoid of the solenoid-operated on-off valve is de-energized, the directional control valve connects the hydraulic pressure generating means to the hydraulic actuator.

According to the present invention, there is also provide a control system for a continuously variable transmission having a starting clutch actuator for actuating a starting clutch disposed in a power transmission path from an input shaft to an output shaft, for selectively transmitting power along the power transmission path, the control system comprising a solenoid-operated control valve for generating a controlling hydraulic pressure to be supplied to the starting clutch actuator in response to a controlling current, hydraulic pressure generating means for generating a hydraulic pressure corresponding to the rotational speed of an engine which rotates the input shaft, a directional control valve for selectively connecting the solenoid-operated control valve and the hydraulic pressure generating means to the starting clutch actuator, and a solenoid-operated on-off valve for controlling the directional control valve such that when a solenoid of the solenoid-operated on-off valve is energized, the directional control valve connects the solenoid-operated control valve to the starting clutch actuator, and when the solenoid of the solenoid-operated on-off valve is de-energized, the directional control valve connects the hydraulic pressure generating means to the starting clutch actuator.

According to the present invention, there is further provided a control system for a belt-type continuously variable transmission having an input shaft, a drive movable pulley coupled to the input shaft, an output shaft, a driven movable pulley coupled to the output shaft, a V-belt trained around the drive and driven movable pulleys, a drive pulley cylinder for varying a width of the drive movable pulley, and a driven pulley cylinder for varying a width of the driven movable pulley, the control system comprising a regulator valve assembly for generating a pulley controlling hydraulic pressure to be supplied to at least one of the drive and driven pulley cylinders for controlling the pulley thereof, an electrically operated actuator, a shift valve actuatable by the electrically operated actuator for supplying the pulley controlling hydraulic pressure from the regulator valve assembly to the drive and driven pulley cylinders, hydraulic pressure generating means for generating a hydraulic pressure corresponding to the rotational speed of an engine which rotates the input shaft, a shift inhibitor valve for supplying the pulley controlling hydraulic pressure from the regulator valve assembly to at least one of the drive and driven pulley cylinders through a hydraulic passage other than the shift valve under the control of the hydraulic pressure corresponding to the rotational speed of the engine, a directional control valve for selectively connecting the shift valve and the shift inhibitor valve to the drive and driven pulley cylinders, and a solenoid-operated on-off valve for controlling the directional control valve such that when a solenoid of the solenoid-operated on-off valve is energized, the directional control valve connects the shift valve to the drive and driven pulley cylinders, and when the solenoid of the solenoid-operated on-off valve is de-energized, the directional control valve connects the shift inhibitor valve to at least one of the drive and driven pulley cylinders.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 1:
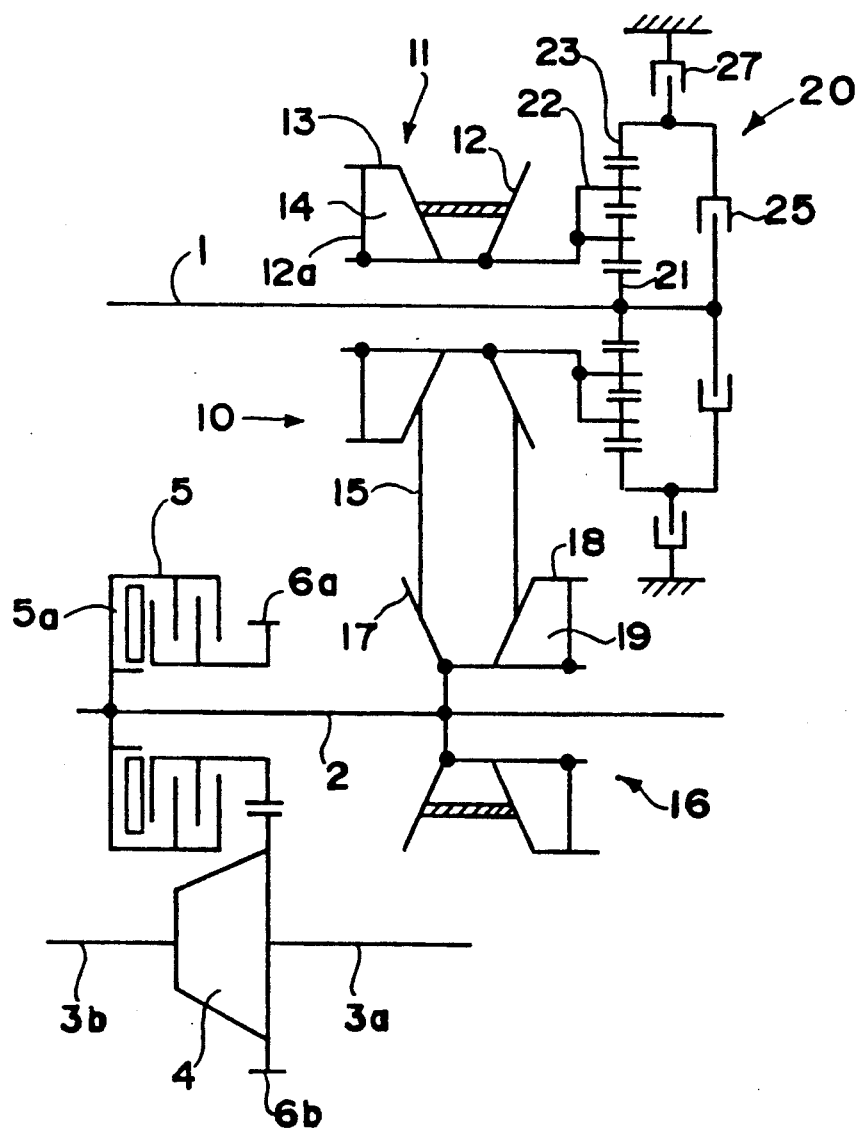
FIG. 1 is a schematic diagram showing a skeletonic representation of a V-belt-type continuously variable transmission controllable by a control system according to the present invention.

FIG. 1 schematically shows the power transmission path of a V-belt-type continuously variable transmission controllable by a control system according to the present invention.

The V-belt-type continuously variable transmission generally comprises a metallic V-belt mechanism 10 disposed between and operatively coupled to an input shaft 1 and a countershaft 2, a planetary-gear forward-/reverse selector mechanism 20 disposed between and operatively coupled to the input shaft 1 and a drive movable pulley 11, and a starting clutch 5 disposed between and operatively coupled to the countershaft 2 and output shafts 3a, 3b. The V-belt-type continuously variable transmission is incorporated in a motor vehicle with the input shaft 1 connected to the engine output shaft and the output shafts 3a, 3b to respective road wheels.

The metallic V-belt mechanism 10 comprises a drive movable pulley 11 mounted on the input shaft 1, a driven movable pulley 16 disposed on the countershaft 2, and a metallic V-belt 15 trained around the pulleys 11, 16. The drive movable pulley 11 comprises a fixed pulley cone 12 rotatably mounted on the input shaft 1, and a movable pulley cone 13 axially movable toward and away from the fixed pulley cone 12. A cylinder chamber 14 is defined laterally of the movable pulley cone 13 by a cylinder wall 12a joined to the fixed pulley cone 12. The cylinder chamber 14 is supplied with a hydraulic pressure to develop a lateral pressure that acts to move the movable pulley cone 13 axially. The driven movable pulley 16 comprises a fixed pulley cone 17 fixedly mounted on the countershaft 2, and a movable pulley cone 18 axially movable toward and away from the fixed pulley cone 17. A cylinder chamber 19 is defined laterally of the movable pulley cone 18 by a cylinder wall 17a joined to the fixed pulley cone 17. The cylinder chamber 19 is supplied with a hydraulic pressure to develop a lateral pressure that acts to move the movable pulley cone 18 axially.

When the hydraulic pressures (pulley controlling hydraulic pressures) supplied to the cylinder chambers 14, 19 are controlled, the widths of the pulleys 11, 16 vary to change the effective pulley diameters for continuously varying the speed ratio that is established by the metallic V-belt mechanism 10.

The planetary-gear forward/reverse selector mechanism 20 comprises a sun gear 21 coupled to the input shaft 1, a carrier 22 coupled to the fixed pulley cone 12, a ring gear 23 that can be held against rotation by a reverse brake 27, a plurality of planet gears rotatably supported on the carrier 22 and held in mesh with the sun gear 21 and the ring gear 23, and a forward clutch 25 for selectively connecting the sun gear 21 and the ring gear 23 to each other. When the forward clutch 25 is engaged, the gears 21, 22, 23 rotate in unison with the input shaft 1, rotating the drive pulley 11 in the same direction (forward direction) as the input shaft 11. When the reverse brake 27 is engaged, the ring gear 23 is held against rotation, and hence the carrier 22 rotates in the direction opposite to the direction in which the sun gear 21 rotates, rotating the drive pulley 11 in the opposite direction (reverse direction) to the input shaft 1.

The starting clutch 5 serves to selectively transmit the engine power between the countershaft 2 and the output shafts 3a, 3b. When the starting clutch 5 is engaged by a biassing force produced by a hydraulic actuator (hydraulic cylinder) 5a, it transmits the engine power from the countershaft 2 to the output shafts 3a, 3b. More specifically, when the starting clutch 5 is engaged, the engine power transmitted, with an adjusted speed ratio, from the metallic V-belt mechanism 10 is transmitted through gears 6a, 6b to a differential 4, from which the engine power is transmitted to the output shafts 3a, 3b and the road wheels. When the starting clutch 5 is disengaged, the engine power is not transmitted from the countershaft 2 to the output shafts 3a, 3b. At this time, the V-belt-type continuously variable transmission is in a neutral state.

Figure 2:
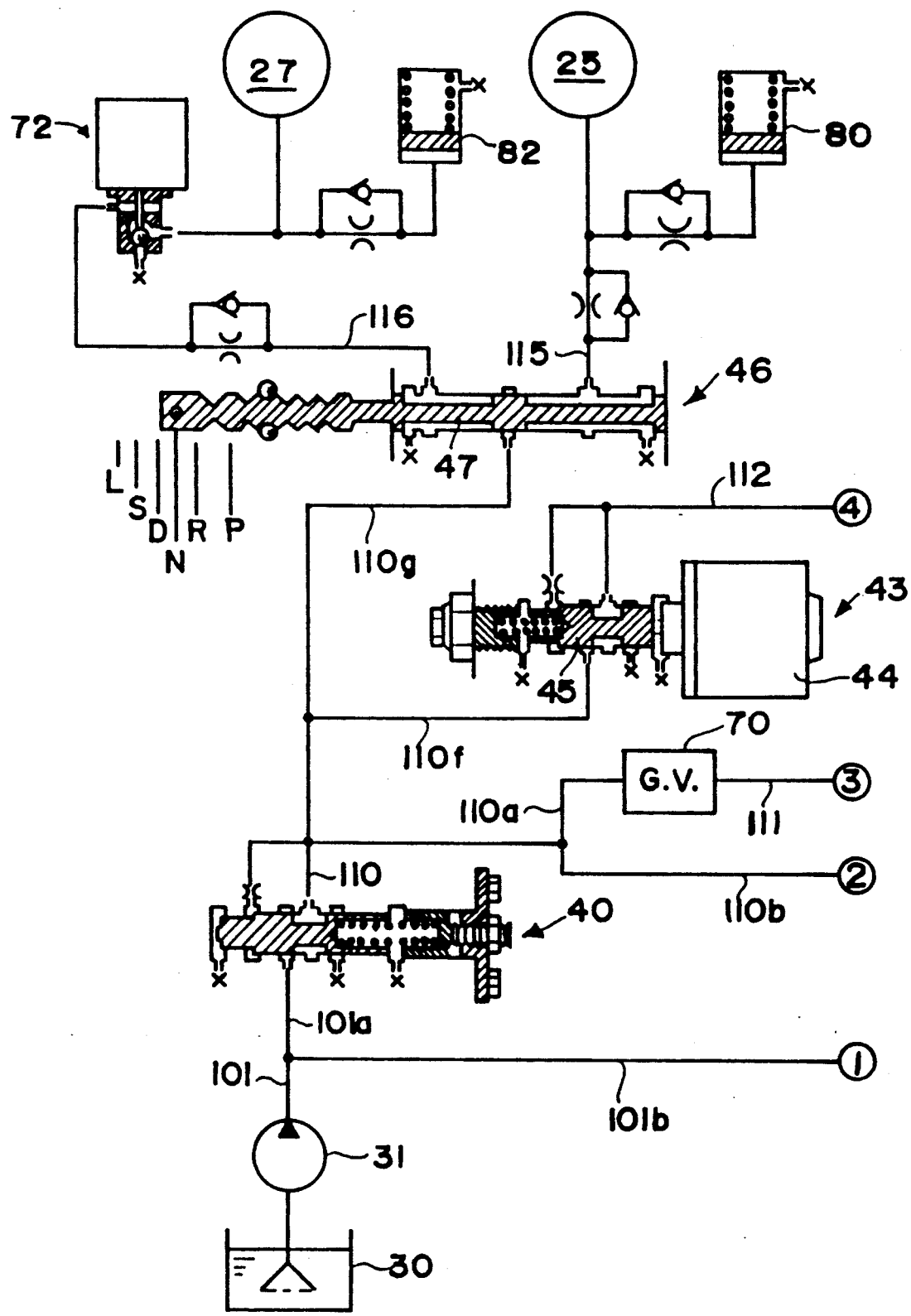
FIGS. 2 and 3 are diagrams of a hydraulic circuit of the control system.
Figure 3:
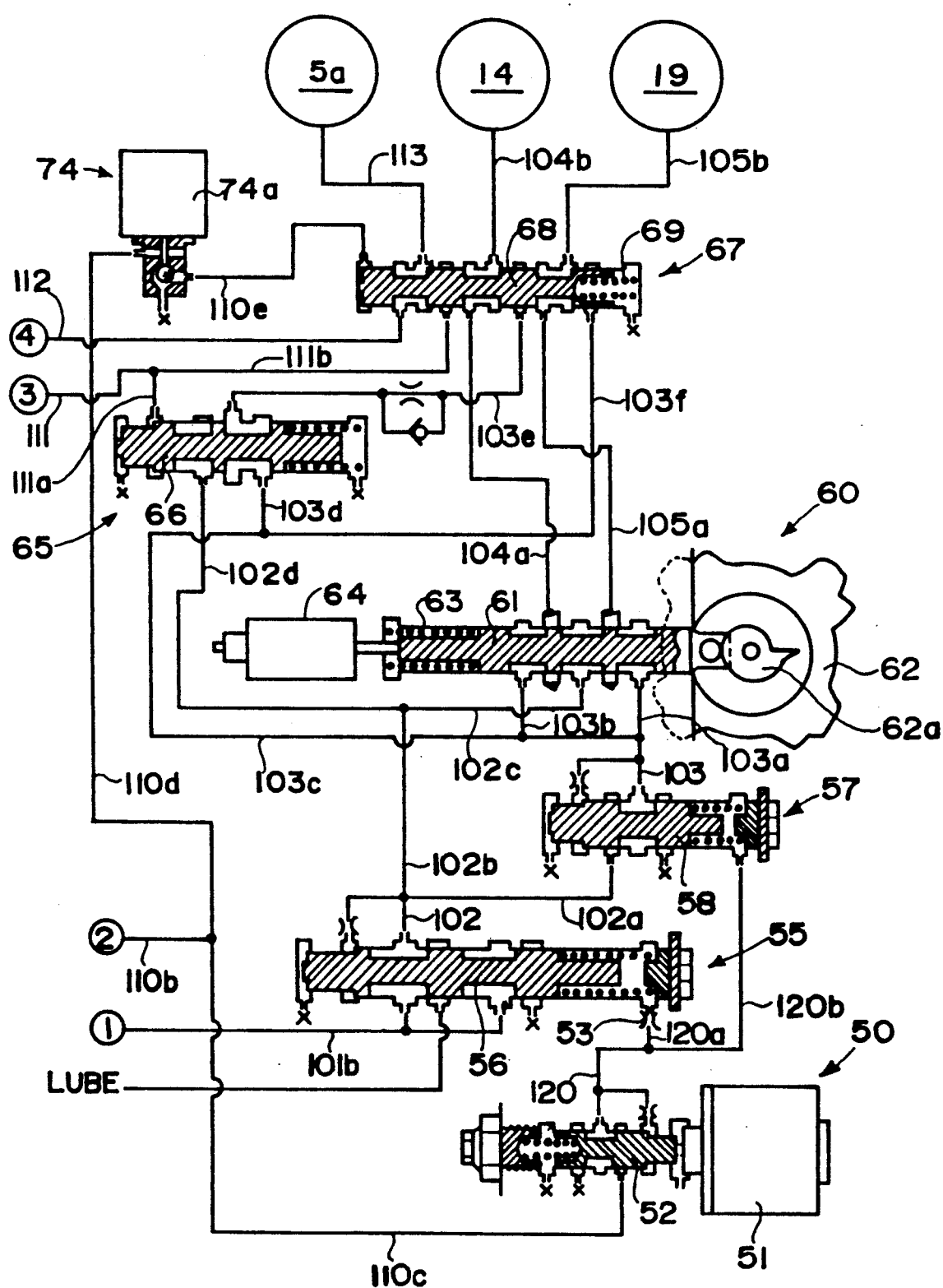

A control system for controlling the V-belt-type continuously variable transmission will be described below with reference to FIGS. 2 and 3. FIGS. 2 and 3 jointly illustrate a single hydraulic circuit of the control system that includes hydraulic passages 1, 2, 3, 4 interconnected between FIGS. 2 and 3.

The hydraulic circuit includes a tank 30 from which working oil is supplied to a hydraulic passage 101 by a hydraulic pump 31. The working oil is then supplied through a hydraulic passage 101a to a clutch reducing valve 40. The working oil is reduced in pressure by the clutch reducing valve 40, and then supplied under a line pressure P1 to a hydraulic passage 110. The working oil discharged from the hydraulic pump 31 to the hydraulic passage 101 is also supplied to a high-pressure regulator valve 55 through a hydraulic passage 101b.

The controlling hydraulic pressure supplied to the cylinder chambers 14, 19 of the metallic V-belt mechanism 10 for imparting a lateral pressure to the pulleys 11, 16, is generated by a high-/low-pressure control valve 50, the high-pressure regulator valve 55, and a low-pressure regulator valve 57. The high-/low-pressure control valve 50 is supplied with the line pressure P1 from the clutch reducing valve 40 through hydraulic passages 110b, 110c. The high/low-pressure control valve 50 converts the line pressure P1 into a controlling back pressure P2 corresponding to a pushing force applied to a spool 52 by a linear solenoid 51, and supplies the controlling back pressure P2 to a hydraulic passage 120.

The high-/low-pressure control valve 50 is arranged such that when the pushing force applied to the spool 52 by the linear solenoid 51 is minimum, the controlling back pressure P2 is maximum and equal to the line pressure P1. In the event of an electric failure that de-energizes the linear solenoid 51, the controlling back pressure P2 is equalized to the line pressure P1.

The controlling back pressure P2 is supplied to the high-pressure regulator valve 55 and the low-pressure regulator valve 57 through respective hydraulic passages 120a, 120b. The high-pressure regulator valve 55 converts the hydraulic pressure supplied from the pump 31 through the hydraulic passage 101b into a high controlling pressure PH corresponding to a pushing force applied to a spool 56 thereof under the controlling back pressure P2. The high-pressure regulator valve 55 supplies the high controlling pressure PH to a hydraulic passage 102. The low-pressure regulator valve 57 converts the high controlling pressure PH supplied thereto through the hydraulic passage 102 and a hydraulic passage 102a into a low controlling pressure PL corresponding to a pushing force applied to a spool 58 thereof under the controlling back pressure P2. The low-pressure regulator valve 57 supplies the low controlling pressure PL to a hydraulic passage 103.

The high controlling pressure PH and the low controlling pressure PL are supplied through a shift valve 60 to the cylinder chambers 14, 19 of the V-belt mechanism 10 for controlling the speed ratio. The linear solenoid 51 of the high-/low-pressure control valve 50 generates the pushing force depending on the throttle opening of the engine, and the speed ratio of the V-belt mechanism 10, so that the high controlling pressure PH and the low controlling pressure PL are maintained in a predetermined relationship to the throttle opening and the speed ratio.

The hydraulic passage 120a has an orifice 53 for making the low-pressure regulator valve 57 more responsive to the controlling back pressure P2 than the high-pressure regulator valve 55.

Since the working oil discharged by the pump 31 is supplied to the high-pressure regulator valve 55, the high-pressure regulator valve 55 serves as a valve for regulating the pressure of the working oil discharged by the pump 31.

The low controlling pressure PL developed by the low-pressure regulator valve 57 serves to control the tension of the V-belt 15, and hence is set to a level for keeping the V-belt 15 under desired tension.

The high controlling pressure PH and the low controlling pressure PL thus developed are supplied respectively to the cylinder chambers 14, 19 of the pulleys 11, 16 for varying the pulley widths thereby to control the speed ratio. The shift valve 60, a shift inhibitor valve 65, and a ratio inhibitor valve 67 are provided to control the selective supply of the high controlling pressure PH and the low controlling pressure PL to the cylinder chambers 14, 19.

The shift valve 60 has a spool 61 that is normally urged to the right, as viewed in FIG. 3, by a spring 63. The spool 61 has a righthand end held against a cam 62a coupled to an electrically operated actuator 62. Therefore, the spool 61 can be positioned when the cam 62a is angularly moved by the electrically operated actuator 62. The shift valve 60 is supplied with the high controlling pressure PH through the hydraulic passage 102 and hydraulic passages 102b, 102c, and also with the low controlling pressure PL through the hydraulic passage 103 and hydraulic passages 103a, 103b. The high controlling pressure PH and the low controlling pressure PL are selectively supplied respectively to hydraulic passages 104a, 105a depending on the axial position of the spool 61. The axial position of the spool 61 is detected by a position sensor 64 that is held against the lefthand end of the spool 61. The ratio inhibitor valve 67 has a spool 68 that is normally urged to the left, as viewed in FIG. 3, by a spring 69. The working oil supplied to the hydraulic passages 104a, 105a flows through the ratio inhibitor valve 67 and hydraulic passages 104b, 105b into the cylinder chambers 14, 19.

When the electrically operated actuator 62 is thus controlled in operation to shift the spool 61, the supply of the hydraulic pressures to the cylinder chambers 14, 19 is controlled for controlling the speed ratio. The operation of the electrically operated actuator 62 is controlled based on the throttle opening and rotational speed of the engine.

As described above, the spool 68 of the ratio inhibitor valve 67 is normally urged to the left by the spring 69. When a hydraulic passage 110e connected to the lefthand end of the ratio inhibitor valve 67 is supplied with the line pressure P1 through the hydraulic passages 110, 110b, a hydraulic passage 110d, and a solenoid-operated on-off valve 74, the spool 68 is axially shifted to the right under the line pressure P1. When the spool 68 is shifted to the right, it closes off the hydraulic passages 104a, 105a, and brings the hydraulic passages 104b, 104b into communication with hydraulic passages 103e, 103f, respectively. The solenoid-operated on-off valve 74 is a normally closed valve with its drain port being normally closed, and has a normally energized solenoid 74a. Therefore, when the solenoid 74a is energized, the solenoid-operated on-off valve 74 is closed, with no hydraulic pressure developed in the hydraulic passage 110e. When the solenoid 74a is de-energized, the solenoid-operated on-off valve 74 is opened to supply the line pressure P1 to the hydraulic passage 110e. Only when the power supply fails due to an electric malfunction or a wire breakage, for example, the normally energized solenoid 74a is de-energized, allowing the line pressure P1 to act on the left-hand end of the spool 68 of the ratio inhibitor valve 67 through the hydraulic passage 110e.

Therefore, if the linear solenoid 51 and the electrically operated actuator 62 fail to operate due to an electric failure or a wire breakage, then the solenoid-operated on-off valve 74 is opened to permit the spool 68 to move to the right. As a result, upon an electric failure, the hydraulic pressures from the hydraulic passages 103e, 103f are supplied to the cylinder chambers 14, 19 for controlling the speed ratio.

The hydraulic passage 103e is connected to the shift inhibitor valve 65, so that the hydraulic pressure developed by the shift inhibitor valve 65 can be supplied to the cylinder chamber 14. The hydraulic passage 103f is connected to the low-pressure regulator valve 57, so that the cylinder chamber 19 can be supplied with the low controlling pressure PL. In the event of an electric failure, the linear solenoid 51 of the high-/low-pressure control valve 50 is not energized. However, since the high-/low-pressure control valve 50 supplies the controlling back pressure P2 (=line pressure P1) to the hydraulic passage 120 when the linear solenoid 51 is de-energized, the hydraulic passages 102, 103 are supplied with the high controlling pressure PH and the low controlling pressure PL corresponding to the controlling back pressure P2 from the high- and low-pressure regulator The shift inhibitor valve 65 is connected to a governor valve 70 through hydraulic passages 111a, 111. The governor valve 70 operates in synchronism with the rotation of the engine, and converts the line pressure P1 from the hydraulic passage 110 and a hydraulic passage 110a into a governor pressure PG corresponding to the rotational speed of the engine under centrifugal forces developed by the rotation of the engine. The governor pressure PG acts on the lefthand side of a spool 66 of the shift inhibitor valve 65, thereby shifting the spool 66 to the right as viewed in FIG. 3.

Figure 4:
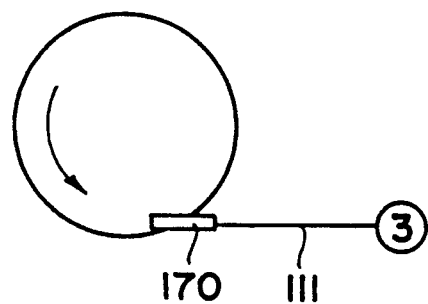
FIGS. 4 and 5 are diagrams showing systems to generate hydraulic pressures corresponding to the engine rotational speed by use of a pitot tube and an electrohydraulic converter valve.
Figure 5:
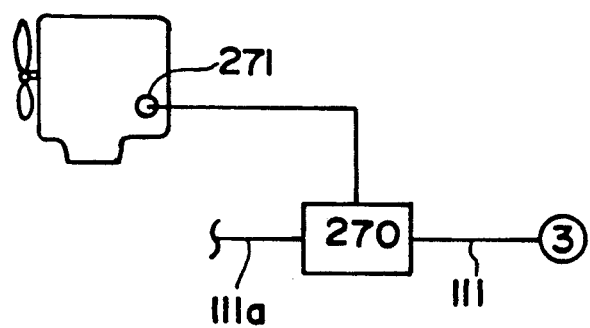

The governor pressure PG is a hydraulic pressure that is commensurate with the rotational speed of the engine. While the hydraulic pressure commensurate with the rotational speed of the engine is generated by the governor valve 70 in the embodiment of FIGS. 2 and 3, the hydraulic pressure commensurate with the rotational speed of the engine may be a hydraulic pressure generated by a pitot tube 170 placed in a flow of working oil whose rate corresponds to the rotational speed of the engine as shown in FIG. 4. Alternatively, the hydraulic pressure commensurate with the rotational speed of the engine may be produced by an electro-hydraulic converter valve 270 that converts an electric signal indicative of the rotational speed of the engine from a speed sensor 271 into a corresponding hydraulic pressure as shown in FIG. 5.

When the rotational speed of the engine is relatively low and hence the governor pressure PG is relatively low, the spool 66 is shifted to the left, allowing the low controlling pressure PL supplied from the low-pressure regulator valve 57 through the hydraulic passage 103 and hydraulic passages 103c, 103d to flow through the hydraulic passage 103e to the cylinder chamber 14 of the drive pulley 11. When the rotational speed of the engine is increased and hence the governor pressure PG is also increased, the spool 66 is shifted to the right under the governor pressure PG, allowing the high controlling pressure PH supplied from the high-pressure regulator valve 55 through the hydraulic passages 102, 102b and a hydraulic passage 102d to flow through the hydraulic passage 103e to the cylinder chamber 14 of the drive pulley 11.

Accordingly, in the event of an electric failure, the cylinder 14 of the drive pulley 11 is supplied with the low controlling pressure PL when the rotational speed of the engine is comparatively low, and with the high controlling pressure PH when the rotational speed of the engine is comparatively high. The cylinder chamber 19 of the driven pulley 16 is supplied with the low controlling pressure PL.

As described above, while the rotational speed of the engine is low, both of the cylinder chambers 14, 19 are supplied with the low controlling pressure PL. At this time, the widths of the drive and driven pulleys 11, 16 are equal to each other, and the speed ratio approaches 1.0. Since the V-belt 15 tends to bite into the drive pulley 11 due to the drive torque thereof, thereby reducing the effective pulley diameter, the speed ratio actually varies so that it is greater than 1.0 (i.e., varies toward the LOW position). This tendency is greater as the drive torque is larger. As the drive torque becomes larger, the speed ratio varies toward the LOW position. When the motor vehicle is subjected to engine brake, since the driven pulley 16 drives the drive pulley 11, the speed ratio varies so that it is smaller than 1.0 (i.e., varies toward the TOP position).

When the rotational speed of the engine is relatively high, applying the high controlling pressure PH to the cylinder chamber 14 of the drive pulley 11 and the low controlling pressure PL to the cylinder chamber 19 of the driven pulley 16, the speed ratio is reduced to a minimum value (i.e., varies toward the TOP position).

As described above, in the event that the electric energy is cut off due to an electric malfunction or the like, de-energization of the solenoid 74a of the solenoid-operated on-off valve 74 shifts the spool 68 of the ratio inhibitor valve 67 to the right, thereby allowing the speed ratio to be controlled to some extent with the governor pressure PG. In this case, the ratio inhibitor valve 67 serves as a directional control valve.

In this embodiment, the controlling pressures PH, PL generated by the high- and low-pressure regulator valves 55, 57 are selectively supplied respectively to the cylinder chambers 14, 19 by the shift valve 60 for controlling the speed ratio. The control system according to the present invention is not limited to such an arrangement, but may be modified in various ways. For example, the cylinder chamber 19 may always be supplied with a hydraulic pressure suitable for controlling the tension of the V-belt 15, and the cylinder chamber 14 may be supplied with a controlling pressure for controlling the speed ratio. In such a modification, the directional control valve (ratio inhibitor valve) controls only the controlling pressure supplied to the cylinder chamber 14.

The line pressure P1 is also supplied to a manual valve 46 through a hydraulic passage 110g for the control of the forward clutch 25 and the reverse brake 27. The manual valve 46 is connected to a shift lever (not shown) at the driver's seat through a control cable (not shown), so that the manual valve 46 can be operated manually by the driver of the motor vehicle. The shift lever can manually be moved selectively into six positions P, R, N, D, S, L (see FIG. 2). The manual valve 46 has a spool 47 that is moved into one of illustrated positions corresponding to the respective positions P, R, N, D, S, L, depending on the position into which the shift lever is manually shifted. In FIG. 2, the spool 47 is shown as being in the neutral position N.

The positions P, R, N, D, S, L that can be taken by the spool 47 and the operating conditions of the forward clutch 25 and the reverse brake 27 are related to each other as shown in the following table:

| Spool Position | Forward Clutch 25 | Reverse Brake 27 |
| --- | --- | --- |
| P | OFF | OFF |
| R | OFF | ON |
| N | OFF | OFF |
| D | ON | OFF |
| S | ON | OFF |
| L | ON | OFF |

The manual valve 46 is connected to the forward clutch 25 through a hydraulic passage 115, and also to the reverse brake 27 through a hydraulic passage 116 having a solenoid-operated valve 72. When the solenoid-operated valve 72 is actuated, it closes the hydraulic passage 116 for thereby preventing the reverse brake 27 from being applied. The solenoid-operated valve 72 serves as a vehicle speed inhibitor that is actuated if the vehicle speed is higher than a predetermined speed when the shift lever is shifted into the position R while the motor vehicle is running. The vehicle speed inhibitor prevents the reverse brake 27 from being applied unless the vehicle speed drops below the predetermined speed.

To the forward clutch 25 and the reverse brake 27, there are connected respective accumulators 80, 82 for dampening shocks that are produced when the forward clutch 25 and the reverse brake 27 are engaged.

Normally, i.e., when the control system does not suffer an electric failure or other malfunctioning, the starting clutch 5 is connected to a clutch control valve 43 through hydraulic passages 112, 113 and the ratio inhibitor valve 67 coupled between the hydraulic passages 112, 113, and is controlled for its engagement by a clutch controlling pressure PC supplied by the clutch control valve 43. The clutch control valve 43 has a linear solenoid 44 that controls a spool 45 to convert the line pressure PL supplied from a hydraulic passage 110f connected to the hydraulic passage 110 into the clutch controlling pressure PC.

When an electric failure causes an electric energy interruption, the solenoid-operated valve 43 is not actuated. At this time, since the spool 68 of the ratio inhibitor valve 67 is moved to the right, it closes the hydraulic passage 112, and connects the hydraulic passage 111 to the starting clutch 5 through a hydraulic passage 111b and the hydraulic passage 113. As the hydraulic passage 111 is connected to the governor valve 70, the starting clutch 5 is supplied with the governor pressure PG.

Therefore, when the rotational speed of the engine is relatively low, the starting clutch 5 is disengaged, and when the rotational speed of the engine is relatively high, the starting clutch 5 is engaged.

The starting clutch 5 is thus usually controlled by the clutch controlling pressure PC from the clutch control valve 43 that is electrically operated. In the event of an electric failure, the starting clutch 5 is controlled by the governor pressure PG from the governor valve 70. In this case, the ratio inhibitor valve 67 also serves as a directional control valve.

According to an aspect of the present invention, when the solenoid-operated on-off valve is energized, the solenoid-operated clutch control valve is connected to the starting clutch by the directional control valve (ratio inhibitor valve), and when the solenoid-operated on-off valve is de-energized, the governor valve is connected to the starting clutch by the directional control valve. Therefore, in the event of an electric failure that interrupts the supply of controlling electric energy, the solenoid-operated on-off valve is de-energized, allowing the governor valve to be connected to the starting clutch. Thus, the starting clutch is controlled for its engagement under the governor pressure from the governor valve.

According another aspect of the present invention, when the solenoid-operated on-off valve is energized, the shift valve is connected to the cylinder chambers of the drive and driven pulleys by the directional control valve (ratio inhibitor valve), and when the solenoid-operated on-off valve is de-energized, the shift inhibitor valve is connected to the cylinder chambers of the drive and driven pulleys by the directional control valve. Therefore, in the event of an electric failure that interrupts the supply of controlling electric energy, the solenoid-operated on-off valve is de-energized, allowing the shift inhibitor valve to be connected to at least one of the cylinder chambers of the drive and driven pulleys. The shift inhibitor valve is now actuated under the governor valve to supply hydraulic pressures to the cylinder chambers of the drive and driven pulleys through hydraulic passages other than the shift valve. Consequently, the speed ratio can be controlled to some extent, so that the running of the motor vehicle may be controlled even in the event of an electric failure.

Accordingly, even if the solenoid-operated valves and electrically operated actuator fail to operate due to an electric failure caused by a wire breakage, for example, the belt-type continuously variable transmission can be controlled to vary the speed ratio.

Although a certain preferred embodiment of the present invention has been shown and described in detail, it should be understood that various changes and modifications may be made therein without departing from the scope of the appended claims.

What is claimed is:

1. A control system for a continuously variable transmission having a hydraulic actuator for effecting at least one of speed ratio control and clutch control, comprising:

a solenoid-operated control valve for generating a controlling hydraulic pressure to be supplied to the hydraulic actuator;

hydraulic pressure generating means for generating a hydraulic pressure corresponding to the rotational speed of an engine which is associated with the continuously variable transmission;

a directional control valve for selectively connecting said solenoid-operated control valve and said hydraulic pressure generating means to said hydraulic actuator; and a solenoid-operated on-off valve for controlling said directional control valve such that when a solenoid of said solenoid-operated on-off valve is energized, said directional control valve connects said solenoid-operated control valve means to said hydraulic actuator, and when the solenoid of said solenoid-operated on-off valve is de-energized, said directional control valve connects said hydraulic pressure generating means to said hydraulic actuator.

2. A control system for a continuously variable transmission having a starting clutch actuator for actuating a starting clutch disposed in a power transmission path from an input shaft to an output shaft, for selectively transmitting power along said power transmission path, said control system comprising:

a solenoid-operated control valve for generating a controlling hydraulic pressure to be supplied to said starting clutch actuator in response to a controlling current;

hydraulic pressure generating means for generating a hydraulic pressure corresponding to the rotational speed of an engine which rotates the input shaft;

a directional control valve for selectively connecting said solenoid-operated control valve and said hydraulic pressure generating means to said starting clutch actuator; and a solenoid-operated on-off valve for controlling said directional control valve such that when a solenoid of said solenoid-operated on-off valve is energized, said directional control valve connects said solenoid-operated control valve to said starting clutch actuator, and when the solenoid of said solenoid-operated on-off valve is de-energized, said directional control valve connects said hydraulic pressure generating means to said starting clutch actuator.

3. A control system according to claim 2, wherein said hydraulic pressure generating means comprises a governor valve operable in synchronism with the rotation of the engine, for generating the hydraulic pressure corresponding to the rotational speed of the engine under centrifugal forces developed by the rotation of the engine.

4. A control system according to claim 2, wherein said hydraulic pressure generating means comprises means for generating the hydraulic pressure corresponding to the rotational speed of the engine under a pitot pressure produced by a pitot tube placed in a flow of working oil whose rate corresponds to the rotational speed of the engine.

5. A control system according to claim 2, wherein said hydraulic pressure generating means comprises an electro-hydraulic converter valve for converting an electric signal indicative of the rotational speed of the engine into the hydraulic pressure.

6. A control system according to claim 2, wherein said solenoid-operated on-off valve comprises a normally closed valve, said normally closed valve being arranged such that when the solenoid is energized, the normally closed valve is closed to cut of the supply of working oil to said directional control valve to hold the directional control valve in a position in which said solenoid-operated control valve is connected to said starting clutch actuator; and when the solenoid is de-energized, the normally closed valve is opened to supply working oil to said directional control valve to hold the directional control valve in a position in which said hydraulic pressure generating means is connected to said starting clutch actuator.

7. A control system for a belt-type continuously variable transmission having an input shaft, a drive movable pulley coupled to said input shaft, an output shaft, a driven movable pulley coupled to said output shaft, a V-belt trained around said drive and driven movable pulleys, a drive pulley cylinder for varying a width of said drive movable pulley, and a driven pulley cylinder for varying a width of said driven movable pulley, said control system comprising:

a regulator valve assembly for generating a pulley controlling hydraulic pressure to be supplied to at least one of the drive and driven pulley cylinders for controlling the pulley thereof;

an electrically operated actuator;

a shift valve actuatable by said electrically operated actuator for supplying the pulley controlling hydraulic pressure from said regulator valve assembly to the drive and driven pulley cylinders;

hydraulic pressure generating means for generating a hydraulic pressure corresponding to the rotational speed of an engine which rotates the input shaft;

a shift inhibitor valve for supplying the pulley controlling hydraulic pressure from said regulator valve assembly to at least one of the drive and driven pulley cylinders through a hydraulic passage other than said shift valve under the control of the hydraulic pressure corresponding to the rotational speed of the engine;

a directional control valve for selectively connecting said shift valve and said shift inhibitor valve to the drive and driven pulley cylinders; and a solenoid-operated on-off valve for controlling said directional control valve such that when a solenoid of said solenoid-operated on-off valve is energized, said directional control valve connects said shift valve to the drive and driven pulley cylinders, and when the solenoid of said solenoid-operated on-off valve is de-energized, said directional control valve connects said shift inhibitor valve to at least one of the drive and driven pulley cylinders.

8. A control system according to claim 7, wherein said hydraulic pressure generating means comprises a governor valve operable in synchronism with the rotation of the engine, for generating the hydraulic pressure corresponding to the rotational speed of the engine under centrifugal forces developed by the rotation of the engine.

9. A control system according to claim 7, wherein said hydraulic pressure generating means comprises means for generating the hydraulic pressure corresponding to the rotational speed of the engine under a pitot pressure produced by a pitot tube placed in a flow of working oil whose rate corresponds to the rotational speed of the engine.

10. A control system according to claim 7, wherein said hydraulic pressure generating means comprises an electro-hydraulic converter valve for converting an electric signal indicative of the rotational speed of the engine into the hydraulic pressure.

11. A control system according to claim 7, wherein said solenoid-operated on-off valve comprises a normally closed valve, said normally closed valve being arranged such that when the solenoid is energized, the normally closed valve is closed to cut of the supply of working oil to said directional control valve to hold the directional control valve in a position in which said solenoid-operated control valve is connected to said starting clutch actuator; and when the solenoid is de-energized, the normally closed valve is opened to supply working oil to said directional control valve to hold the directional control valve in a position in which said hydraulic pressure generating means is connected to said starting clutch actuator.

12. A control system according to claim 7, wherein said regulator valve assembly comprises a high-/low-pressure control valve for generating a controlling back pressure P2, a high-pressure regulator valve for converting a working oil pressure from a hydraulic pressure source into a high controlling pressure PH as said pulley controlling hydraulic pressure under the control of said controlling back pressure P2, and a low-pressure regulator valve for converting said high controlling pressure PH into a low controlling pressure PL as said pulley controlling hydraulic pressure under the control of said controlling back pressure P2.

13. A control system according to claim 12, wherein said high-/low-pressure control valve comprises a solenoid-operated valve having a linear solenoid, said high-/low-pressure control valve being arranged such that said controlling back pressure P2 is higher as an electric current supplied to said linear solenoid is smaller.

14. A control system according to claim 12, wherein said low controlling pressure PL serves to control the tension of the V-belt.

15. A control system according to claim 12, wherein said shift inhibitor valve is arranged to supply the drive pulley cylinder with said low controlling pressure PL when the hydraulic pressure corresponding to the rotational speed of the engine is relatively low, and to supply the drive pulley cylinder with said high controlling pressure PH when the hydraulic pressure corresponding to the rotational speed of the engine is relatively high.

* * * * *